United States Patent
Changarankumarath Pradeepkumar et al.

(10) Patent No.: US 12,266,972 B2
(45) Date of Patent: Apr. 1, 2025

(54) LAMINATE WITH VARNISH ACCUMULATION FEATURE

(71) Applicant: Ford Global Technologies, LLC, Dearborn, MI (US)

(72) Inventors: Akash Changarankumarath Pradeepkumar, Westland, MI (US); Singar Rathnam, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 17/946,184

(22) Filed: Sep. 16, 2022

(65) Prior Publication Data

US 2024/0097509 A1    Mar. 21, 2024

(51) Int. Cl.
| | |
|---|---|
| *H02K 1/16* | (2006.01) |
| *H02K 3/12* | (2006.01) |
| *H02K 3/30* | (2006.01) |
| *H02K 15/10* | (2006.01) |

(52) U.S. Cl.
CPC ............... *H02K 1/16* (2013.01); *H02K 3/12* (2013.01); *H02K 3/30* (2013.01); *H02K 15/105* (2013.01)

(58) Field of Classification Search
CPC .......... H02K 3/12; H02K 1/16; H02K 15/105; H02K 3/30; H02K 3/345; H02K 15/024; H02K 15/12
See application file for complete search history.

(56) References Cited

U.S. PATENT DOCUMENTS

| | | | |
|---|---|---|---|
| 8,203,251 B2 | 6/2012 | Ishizuka et al. | |
| 8,963,382 B2 * | 2/2015 | Yoneda | H02K 3/48 310/201 |
| 10,063,118 B2 | 8/2018 | Yoshida et al. | |
| 10,658,884 B2 | 5/2020 | Honjo | |
| 2012/0222289 A1 * | 9/2012 | Nagai | H02K 15/03 29/598 |

* cited by examiner

*Primary Examiner* — Leda T Pham
(74) *Attorney, Agent, or Firm* — Burris Law, PLLC

(57) ABSTRACT

A method for applying varnish to a stator of an electric motor includes depositing varnish onto an outer laminate of the stator, accumulating the deposited varnish with a ridge on the outer laminate, and directing the accumulated varnish into a slot of the outer laminate with the ridge.

20 Claims, 5 Drawing Sheets

LAMINATE WITH VARNISH ACCUMULATION FEATURE

FIELD

The present disclosure relates to manufacturing of an electric motor, specifically to applying varnish to a stator.

BACKGROUND

The statements in this section merely provide background information related to the present disclosure and may not constitute prior art.

Electric propulsion systems in vehicles use electric motors to propel the vehicle as an alternative or in addition to internal combustion engines. Generally, varnish is applied to the electric motors to protect against corrosion and contaminant and to provide structural rigidity, electrical insulation, and thermal conductivity, thereby improving an operation life of the electric propulsion system. The varnish can be applied with a machine designed to apply the varnish to the various components of the motors. During application, varnish may flow away from an intended location or component that uses the varnish, increasing the total amount of varnish used and potentially disrupting manufacture of the electric motor.

The present disclosure addresses challenges related to varnish application to electric motors.

SUMMARY

This section provides a general summary of the disclosure and is not a comprehensive disclosure of its full scope or all of its features.

In one form, a stator of an electric motor includes an outer laminate including a ridge and defining a first slot and an inner laminate including a second slot aligned with the first slot of the outer laminate. The ridge is configured to direct varnish applied by a varnish injector into the first slot and the second slot.

In variations of the stator, which may be implemented individually or in combination: the ridge includes a sloped side angled toward the first slot to have the varnish flow down the sloped side to the first slot; the outer laminate further includes a second ridge radially outward of the ridge; the outer laminate further includes a third ridge radially outward of the second ridge, the second and third ridges configured to accumulate varnish that flows past the ridge; the inner laminate includes a ridge configured to mate with the ridge of the outer laminate; the inner laminate defines a gap with the ridge of the outer laminate; the ridge is stamped into the outer laminate; a fastener attaches the outer laminate to the inner laminate, wherein the ridge is disposed radially between the first slot and the fastener; the ridge defines a rounded edge facing the first slot; the stator is configured to rotate about a central axis, and the varnish injector is arranged to apply varnish onto the outer laminate via gravity; the stator is configured to rotate to a specified angular position at which the applied varnish flows into the first slot via gravity; the ridge is formed separately from the outer laminate; the ridge extends only partially around a circumference of the outer laminate.

In another form, a method for applying varnish to a stator of an electric motor includes depositing varnish onto an outer laminate of the stator, accumulating the deposited varnish with a ridge on the outer laminate, and directing the accumulated varnish into a slot of the outer laminate with the ridge.

In variations of the method, which may be implemented individually or in combination: the ridge includes a sloped side directed toward the slot, and the method further comprises directing the accumulated varnish along the sloped side into the slot; the method further includes rotating the stator to a first angular position to receive varnish from a varnish injector via gravity and rotating the stator to a second angular position to direct the received varnish into the slot via gravity; the outer laminate includes a second ridge radially outward of the ridge, and the method further comprises accumulating the deposited varnish flowing past the ridge with the second ridge; the method further includes rotating the stator to align a varnish injector with a second slot on the outer laminate; directing the varnish onto a wire disposed in the slot; directing the varnish into a second slot of an inner laminate disposed adjacent to the outer laminate, the second slot of the inner laminate aligned with the slot of the outer laminate.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
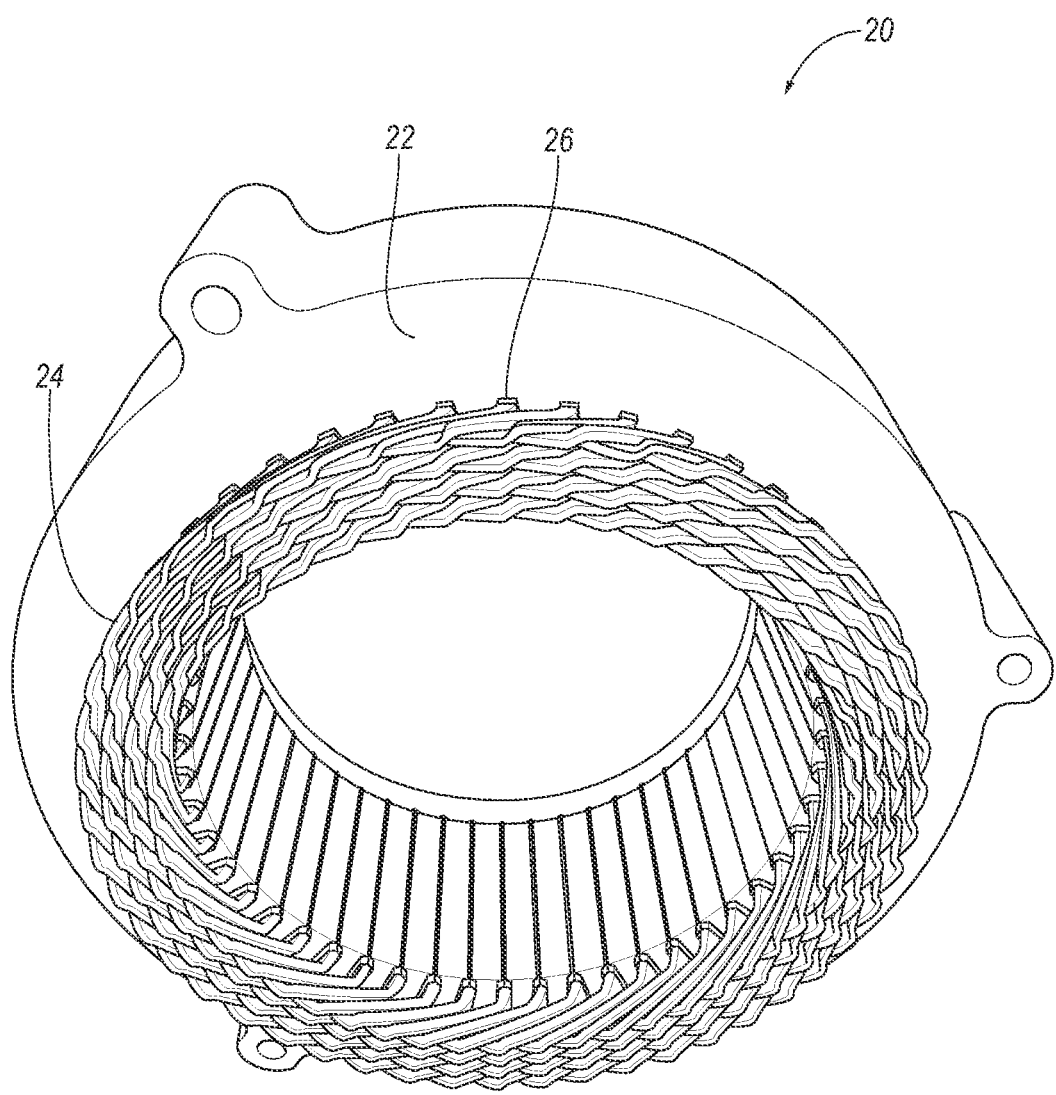
FIG. 1 is a perspective view of a stator of an electric motor according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Among other components, an electric motor includes a stator that is a stationary component generating an electromagnetic field and a rotor which rotates relative to the stator due to the electromagnetic field. The electric motor is a component of an electric propulsion for a motor vehicle such as an "electric vehicle." The electric motor propels the motor vehicle by rotating one or more wheels of the motor vehicle. In one example, the electric motor is a sole propulsion of the vehicle, such as in a fully electric vehicle. Alternatively, the electric motor can be part of a hybrid propulsion that includes an internal combustion engine, such as in a hybrid-electric vehicle.

Figure 2:
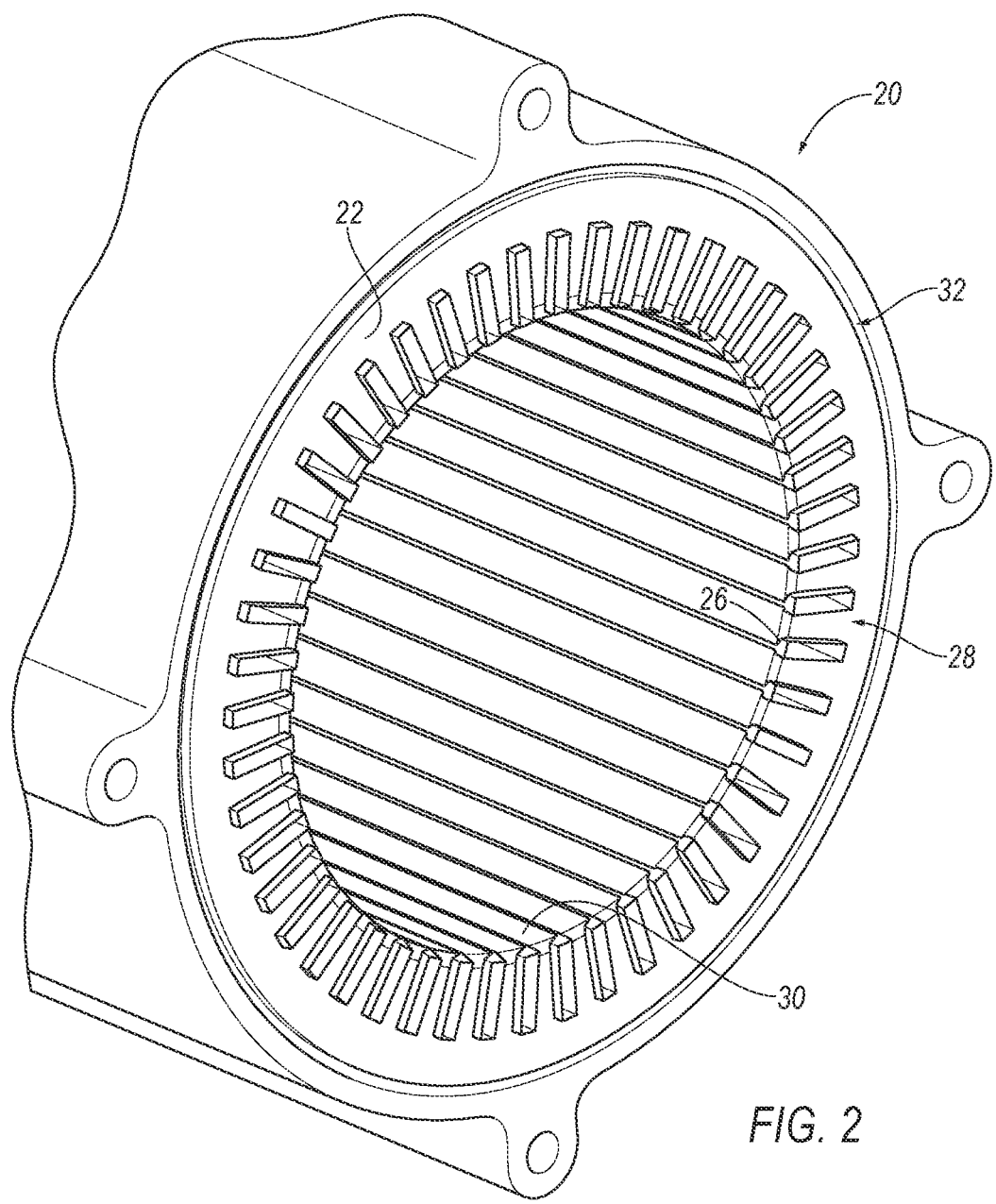
FIG. 2 is a perspective view of a stator core of the electric motor according to the present disclosure.
Figure 3:
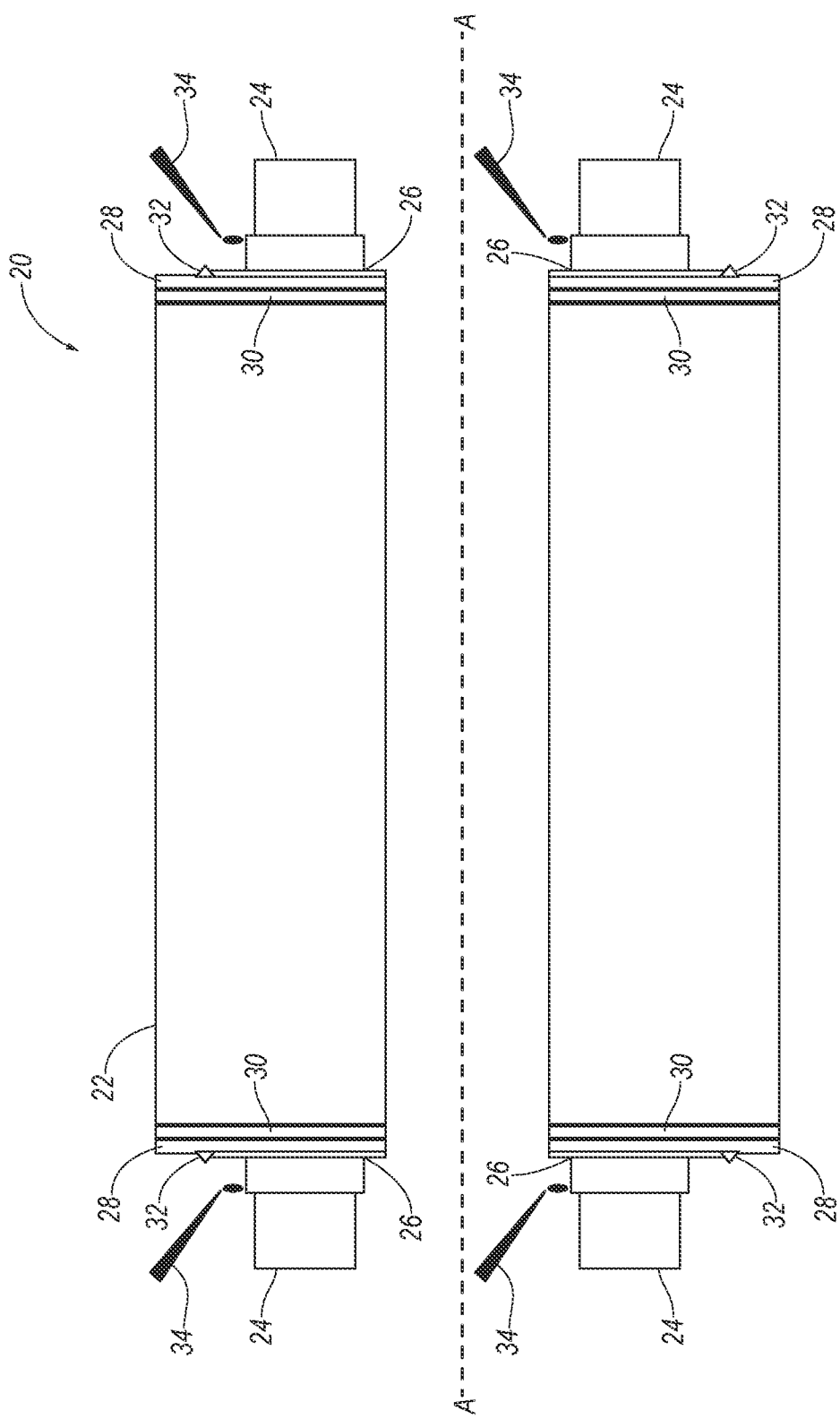
FIG. 3 is a partial cross-sectional view of the stator core according to the present disclosure.

With reference to FIGS. 1-3, an example of a stator 20 for an electric motor is illustrated and includes a stator core 22 and a plurality of wires 24. In one form, the stator core 22 defines a plurality of slots 26, and one or more wires 24 from among the plurality of wires 24 reside in each slot 26. In an example application, the stator core 22 is formed by a plurality of laminates (i.e., sheets of material) that are stacked and fused together. Accordingly, the stator core 22 includes an outer laminate 28 and multiple inner laminates that are generally referenced by reference number 30 and are arranged under the outer laminate 28. That is, the outer laminate 28 is an outermost laminate of the plurality of laminates that form the stator core 22, and the other laminates are inner laminates 30. The teachings of the present disclosure can also be applied to a stator core having a unitary construction that is solid therethrough, and thus, should not be limited to stator cores formed of laminates. With continuing reference to FIG. 1, the wires 24 are formed of an electrically conducting material, such as copper. With the wires 24 arranged in the slots 26, electric current flow through the wire 24 generating electromagnetic field that drives the rotor.

To inhibit corrosion or deterioration of electrical properties of the wires and to provide structural rigidity, electrical insulation, and thermal conductivity to the wires, a varnish (not shown) is applied to the stator during assembly of the electric motor. The varnish is typically applied to an outermost surface of the stator core 22, and capillary action directs the flow of the varnish through the slot 26 and onto the wires 24 in the slot 26. Specifically, the varnish flows though in narrow spaces (i.e., capillaries), such as the slot 26, by adhesion, viscosity, and/or surface tension with the slot 26 without significant influence by, or even against, the force of gravity. The stator core 22 is rotated such that a varnish injector applying the varnish can inject the varnish to each of the slots 26 and the wires 24 therein. When applying varnish to the stator core 22, excess varnish spreading away from the slot 26 may interfere with other parts of the stator 20, potentially inhibiting operation thereof, and increases a total amount of varnish needed for the stator core 22. Controlling flow of varnish into the slots 26 reduces a total amount of varnish used and improves manufacturing of the electric motor, addressing this concern with conventional stator cores.

With continuing reference to FIGS. 2-3, the stator core 22 of the present disclosure is configured to reduce or inhibit the flow of varnish to go beyond the outer laminate 28 or in other words, beyond the stator core 22. More particularly, the outer laminate 28 includes a ridge 32 that is provided as a raised portion of the outer laminate 28. In the form of FIG. 2, the ridge 32 extends continuously about a circumference of the outer laminate 28 as a unitary construction. In another form not shown in the figures, the ridge 32 extends only partially around the outer laminate 28, i.e., the ridge 32 is discontinuous around the outer laminate. For example, the ridge is adapted to include one or more segmented ridges positioned to inhibit varnish from flowing into specified parts of the stator core 22, such as a printed pattern or a bolt. In one form, the ridge 32 is formed separately from the outer laminate 28. The ridge 32 is formed of a metal and attached to the outer laminate 28 in a suitable manner, such as welding, adhering, brazing, and soldering. In another form, the ridge 32 is formed integrally with the outer laminate 28, such as by stamping or molding. The ridge 32 provides flexibility for varnish application to the stator core 22, such as adjusting a drip time for the varnish to flow onto the stator core 22 to accumulate varnish that would flow into the slot 26. In such a form, a height of the ridge 32 can be determined for a specified drip time and/or varnish accumulation volume.

Referring to FIG. 3, in one form, the ridge 32 has a sloped side angled toward the slots 26. The sloped side accumulates varnish when the ridge 32 is below the slot 26, and the sloped side directs the accumulated varnish into the slot 26 when the stator 22 rotates such that the ridge 32 is above the slot 26. More particularly, one or more varnish injectors 34 are arranged to apply varnish to the stator 20 and the stator core 22 is arranged in a fixture or jig that is operable to rotate the stator 20 about a central axis A. The varnish injectors 34 deposit varnish as the stator 20 is being rotated, and the varnish flows, via gravity, onto the stator core 22 and into the slots 26 having the wires 24 therein. Specifically, in the view of FIG. 3, slots 26 arranged above the central axis A of the stator core 22 are below the ridge 32, and varnish deposited onto wires 24 in those slots 26 flows from the ridge 32 to the slots 26. Slots 26 arranged below the central axis A of the stator core 22 are above the ridge 32, and varnish deposited onto wires 24 in those slots 26 accumulates on the ridge 32. While four varnish injectors 34 are illustrated in FIG. 3, any suitable number of varnish injectors 34 may be employed.

Figure 4:
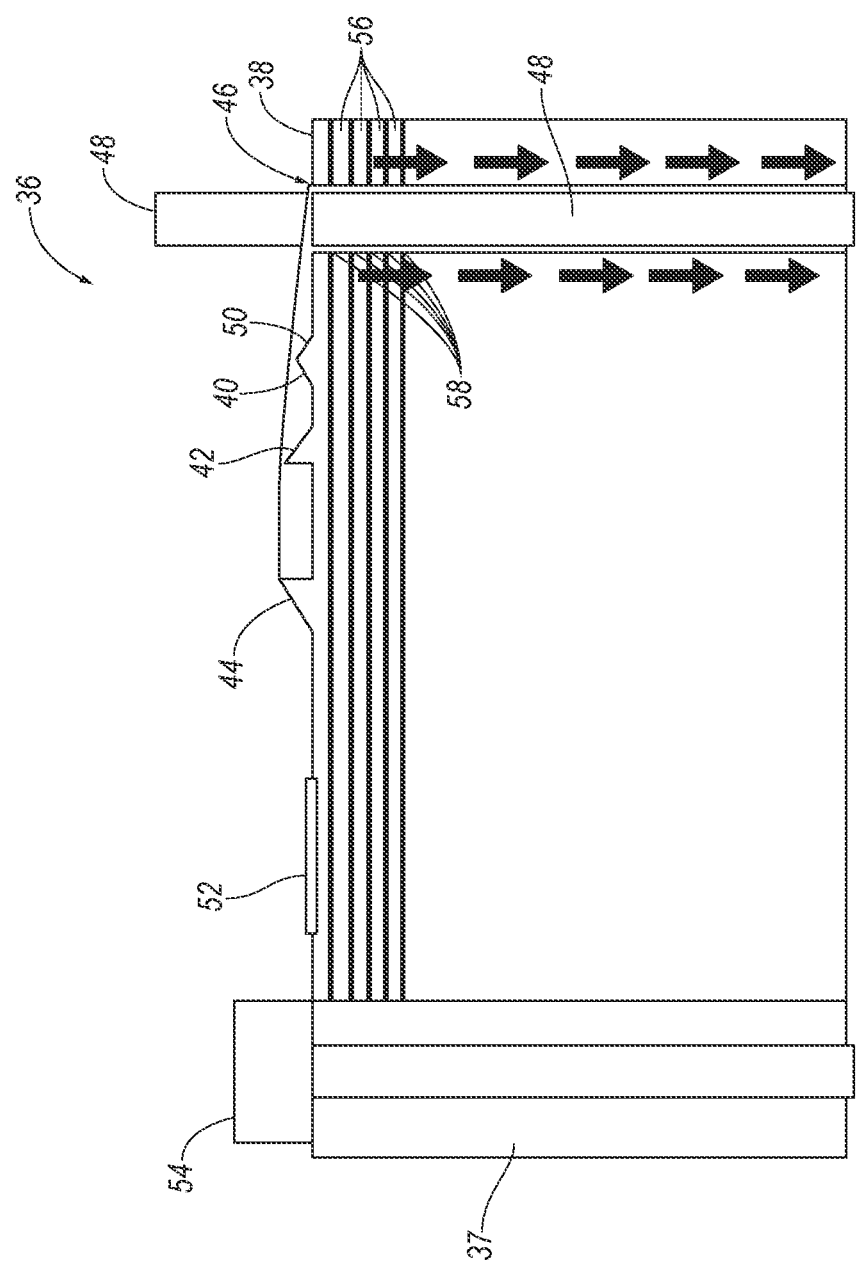
FIG. 4 is a detailed view of a ridge of another stator core according to the present disclosure.

With reference to FIG. 4, in another form, a stator 36 includes multiple ridges to control varnish application is shown. The stator 36 includes a stator core 37 includes an outer laminate 38 and inner laminates 56 with respective slots 58 in which the wires 48 are disposed. The stator 36 further includes a visible pattern 52 that provides identifying information about the electric motor, and a fastener 54 that secures the outer laminate 38 to the inner laminates 56. The outer laminate 38 includes a first ridge 40, a second ridge 42, and a third ridge 44. The first ridge 40 includes a sloped side 50 facing a slot 46 and a wire 48 of the stator 36. The second and third ridges 42, 44 are disposed radially outward of the first ridge 40. In the form of FIG. 4, the first, second, and third ridges 40, 42, 44 have straight or sloped sides, and it is within the scope of the disclosure for the ridges 40, 42, 44 to include rounded or otherwise curved sides. The second and third ridges 42, 44 inhibit varnish flowing past the first ridge 40 from interfering with other parts on the outer laminate 38, such as the visible pattern 52 and the fastener 54. Accordingly, the second and third ridges 42, 44 inhibit opaque or glossy varnish from interfering with readability of the visible pattern 52 by a vision system or a laser reader.

The first ridge 40 directs accumulated varnish from the sloped side 50 into a slot 46 and onto the wires 48 disposed therein. The varnish then flows, by capillary action as described above, through the slot 46 of the outer laminate 38 and into the slots 58 of the inner laminates 56. The second and third ridges 42, 44 are configured to accumulate varnish that flows past the first ridge 40, preventing varnish from flowing onto outer parts of the outer laminate 38. In the form shown, the second and third ridges 42, 44 have straight walls facing each other to contain the varnish between the walls, and it is within the scope of the disclosure for the walls of the second and third ridges 42, 44 to have a different shape to contain the varnish therebetween.

In other forms within the scope of the disclosure, the stator 36 can include a different number of ridges, such as the ridge 32 of FIGS. 2-3, only two of the ridges 40, 42, 44, or more than three ridges in a suitable combination. It is also within the scope of the disclosure to include or lack the visible pattern 52 and/or the fastener 54 from the stator 36, such as when the stator core 37 is a unitary construction without individual laminates 38, 56.

Figure 5:
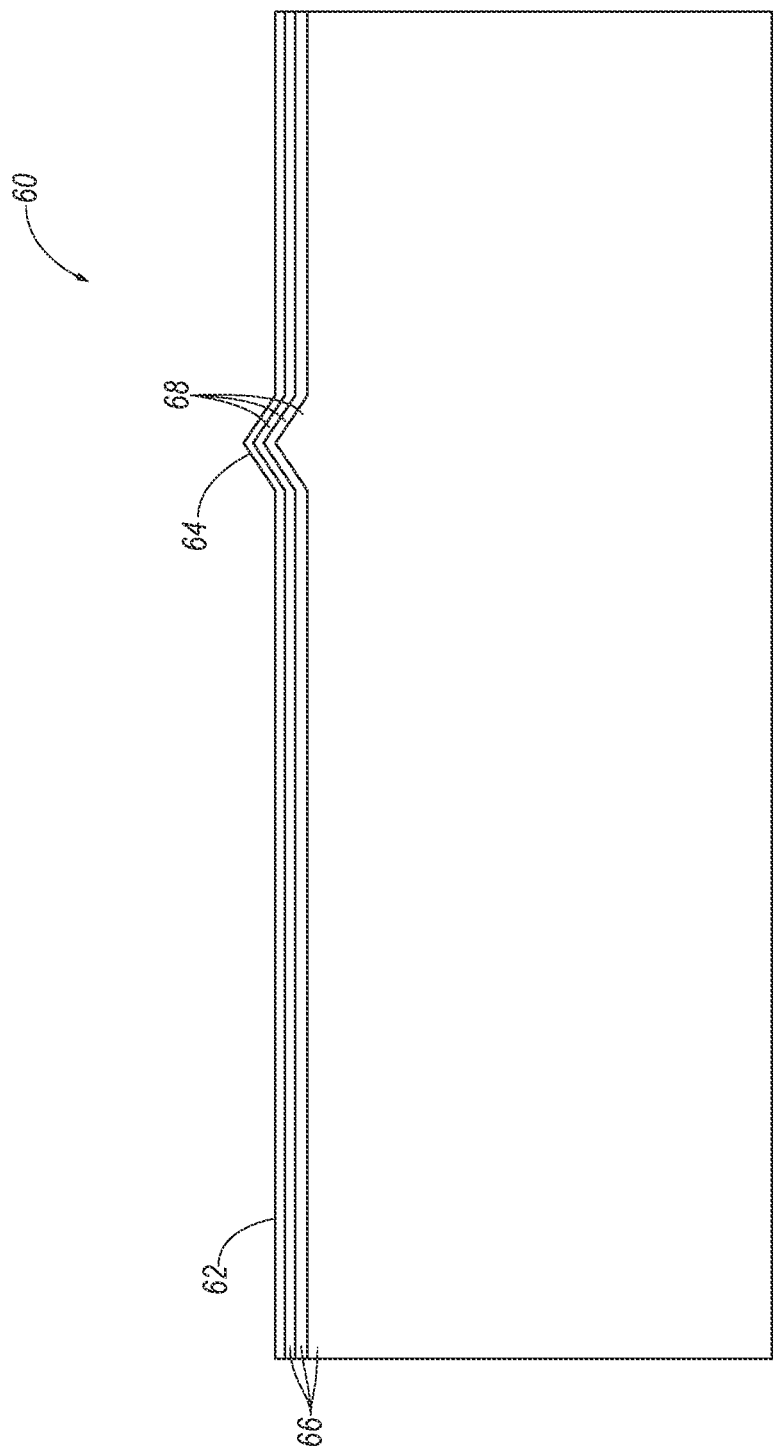
FIG. 5 is a detailed view of a plurality of laminates of another stator according to the present disclosure.

Referring to FIG. 5, a stator core 60 has improved structural strength with a multi-layer ridge structure. Specifically, the stator core 60 includes an outer laminate 62 including a ridge 64 stamped therein and one or more of the inner laminates 66 that include respective ridges 68 configured to mate with ridges 64, 68 of adjacent laminates 62, 66. In the example of FIG. 5, the ridges 64, 68 of the inner and outer laminates 62, 66 are stamped such that the ridge 68 of the inner laminate 66 extends into a gap formed by the ridge 64 of the outer laminate 62. When the ridges 68 of the inner laminates 66 are stacked to mate with the ridge 64 of the outer laminate 62, the stiffness and/or bonding of the outer laminate 62 is improved by the increased mechanical structure that the ridges 68 of the inner laminates 66 provide to the ridge 64 of the outer laminate 62. In another form not shown in the figures, it is within the scope of the disclosure to include one or more of the ridges shown in FIGS. 2-4, such as the ridge 32, 40, 42, 44, in addition to or instead of the ridge 64. In another form not shown in the figures, only the outer laminate 62 has a ridge 64 stamped therein such that the inner laminate 66 defines a gap with the ridge 64.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A stator of an electric motor, the stator comprising:
   an outer laminate including a ridge and defining a first slot; and
   an inner laminate including a second slot aligned with the first slot of the outer laminate,
   wherein the ridge is configured to direct varnish applied by a varnish injector into the first slot and the second slot.

2. The stator of claim 1, wherein the ridge includes a sloped side angled toward the first slot to have the varnish flow down the sloped side to the first slot.

3. The stator of claim 1, wherein the outer laminate further includes a second ridge radially outward of the ridge.

4. The stator of claim 3, wherein the outer laminate further includes a third ridge radially outward of the second ridge, the second and third ridges configured to accumulate varnish that flows past the ridge.

5. The stator of claim 1, wherein the inner laminate includes a ridge configured to mate with the ridge of the outer laminate.

6. The stator of claim 1, wherein the inner laminate defines a gap with the ridge of the outer laminate.

7. The stator of claim 1, wherein the ridge is stamped into the outer laminate.

8. The stator of claim 1, further comprising a fastener attaching the outer laminate to the inner laminate, wherein the ridge is disposed radially between the first slot and the fastener.

9. The stator of claim 1, wherein the ridge defines a rounded edge facing the first slot.

10. The stator of claim 1, wherein the stator is configured to rotate about a central axis, and the varnish injector is arranged to apply varnish onto the outer laminate via gravity.

11. The stator of claim 10, wherein the stator is configured to rotate to a specified angular position at which the applied varnish flows into the first slot via gravity.

12. The stator of claim 1, wherein the ridge is formed separately from the outer laminate.

13. The stator of claim 1, wherein the ridge extends only partially around a circumference of the outer laminate.

14. A method for applying varnish to a stator of an electric motor, the method comprising:
    depositing varnish onto an outer laminate of the stator;
    accumulating the deposited varnish with a ridge on the outer laminate; and
    directing the accumulated varnish into a slot of the outer laminate with the ridge.

15. The method of claim 14, wherein the ridge includes a sloped side directed toward the slot, and the method further comprises directing the accumulated varnish along the sloped side into the slot.

16. The method of claim 14, further comprising rotating the stator to a first angular position to receive varnish from a varnish injector via gravity and rotating the stator to a second angular position to direct the received varnish into the slot via gravity.

17. The method of claim 14, wherein the outer laminate includes a second ridge radially outward of the ridge, and the method further comprises accumulating the deposited varnish flowing past the ridge with the second ridge.

18. The method of claim 14, further comprising rotating the stator to align a varnish injector with a second slot on the outer laminate.

19. The method of claim 14, further comprising directing the varnish onto a wire disposed in the slot.

20. The method of claim 14, further comprising directing the varnish into a second slot of an inner laminate disposed adjacent to the outer laminate, the second slot of the inner laminate aligned with the slot of the outer laminate.

* * * * *